United States Patent [19]
Li

[11] Patent Number: 5,841,918
[45] Date of Patent: Nov. 24, 1998

[54] WAVELENGTH AND BANDWIDTH TUNABLE OPTICAL SYSTEM

[75] Inventor: Jinghui Li, Ontario, Canada

[73] Assignee: JDS Fitel Inc., Ontario, Canada

[21] Appl. No.: 703,034

[22] Filed: Aug. 26, 1996

[51] Int. Cl.[6] ........................................................ G02B 6/28
[52] U.S. Cl. ............................... 385/24; 385/27; 385/37; 385/46; 359/127; 359/130
[58] Field of Search .................................. 385/24, 46, 47, 385/37, 27, 31, 16, 17; 359/124, 127, 130

[56] References Cited

U.S. PATENT DOCUMENTS

| | | | |
|---|---|---|---|
| 5,446,809 | 8/1995 | Fritz et al. | 385/17 |
| 5,608,825 | 3/1997 | Ip | 385/24 |

OTHER PUBLICATIONS

Tuning and Chirping Fiber Bragg Gratings by Deep Etchings; L. Dong; J.L. Cruz; L. Reekie; J.L. Archambault. IEEE Photonics Technology Letters, vol. 7, No. 12, Dec. 1995.

Primary Examiner—Phant H. Palmer
Attorney, Agent, or Firm—Teitelbaum & Associates

[57] ABSTRACT

A system for modifying an input optical signal by reducing its bandwidth and modifying its central wavelength has an optical circulator with at least three ports and at least two optical filters coupled to consecutive ports of the circulator. The first filter produces a predetermined reflected band off the input optical signal. The second filter produces a predetermined transmission band as a part of the reflected band. Either or both of the optical filters are tunable to shape and trim the input signal in a predetermined manner. A multi-channel and cascade configurations may be formed. The system may serve e.g. as a tunable filter or as an add/drop module in WDM communication networks.

22 Claims, 5 Drawing Sheets

WAVELENGTH AND BANDWIDTH TUNABLE OPTICAL SYSTEM

FIELD OF THE INVENTION

This invention relates to a device and system for modifying wavelength, bandwidth or both wavelength and bandwidth of an optical signal, particularly a broadband optical signal, where a relatively narrow band selected from the broadband range is to be produced.

BACKGROUND OF THE INVENTION

Optical filters have been known for a number of years and are used in various configurations to modify an optical signal. As a form of optical filters, Bragg gratings have been gaining popularity. It is known that Bragg gratings can be designed within optical waveguides to reflect a specific band and transmit the remaining range of wavelengths, thus constituting a bandpass filter.

It has been disclosed in U.S. Pat. No. 5,007,705 issued Apr. 16, 1991 to Morey et. al., that Bragg gratings can be tuned, or controlled, to modify their optical response. The modification can include a shift of the characteristic reflective spectrum or band, or an expansion or contraction of the spectrum.

These possibilities have brought about a number of recent proposals involving the use of Bragg gratings in association with various waveguides to modify optical signals.

Two references pertaining to the subject are: L. Dong et al., Tuning and Chirping Fiber Bragg Gratings by Deep Etching, IEEE Photonics Technology Letters, Vol. 7, No. 12, pp. 1433–1435, 1995; and G. A. Ball et al., Compression-Tuned Single-Frequency Bragg Grating Fiber Laser, Optic Letters, Vol. 19, No. 23, pp. 1979–1981, 1994.

It is an object of the invention to provide a system for modifying an optical signal, especially a broadband signal passed through a waveguide in a manner to "trim", or partly block, the spectrum of the initial broadband signal, thus changing either or both the central wavelength (referred to hereinafter as "wavelength") and the bandwidth of the initial signal.

SUMMARY OF THE INVENTION

In accordance with one aspect of the invention, there is provided a tunable optical filter device for modifying an optical signal comprising:

a first optical filter for reflecting at least a band of first predetermined wavelengths of incident light and for transmitting other wavelengths;

a second optical filter optically coupled to the first optical filter and for transmitting at least a band of second predetermined wavelengths of incident light and for reflecting other wavelengths; and tuning means for tuning at least one of the first optical filter and the second optical filter such that a plurality of wavelengths are included in both the first predetermined wavelengths and the second predetermined wavelengths.

In accordance with a further aspect of the invention, there is provided a tunable optical filter device for modifying an optical signal comprising:

a first optical filter having a predetermined reflection spectrum, for receiving said optical signal and for producing a reflected band within said reflection spectrum, a second optical filter having a predetermined transmission spectrum, said second optical filter being optically coupled to said reflected band of said first optical filter, for producing a transmitted band within said transmission spectrum, and tuning means for tuning at least one of said first optical filter and said second optical filter to cause said reflection spectrum of said first filter to partly overlap in a predetermined manner with the wavelength and bandwidth of said optical signal thus causing said first filter to produce a reflected band, and to cause said transmission spectrum of said second optical filter to overlap with said reflected band in a predetermined manner.

The optical filter or filters may be Bragg gratings, interference filters or other known optical tunable filter means. Tuning means comprise means for shifting or expanding the transmission or reflection spectrum respectively such as to achieve a desired overlap of the spectra thus effecting the trimming or blocking of the initial optical signal bandwidth.

Interference filters can be tuned for example by the tilting or changing the distance between two interference layers.

While the invention may be realized using just two optical filter means the reflection and transmission spectra of which are tunable to effect a desired overlap, it will also be demonstrated that the invention may be realized in a cascade mode wherein the basic system of the invention is multiplied.

Preferably, but not exclusively, the invention may be realized using at least one optical circulator, each having at least three ports, the circulator being optically coupled with optical filter means such as Bragg gratings and their respective tuning means.

In another embodiment, the invention comprises a tunable optical filter device for modifying an optical signal comprising a multi-port circulator having an input port and a plurality of consecutive, sequential ports to which are coupled optical filters. At least the first of the optical filters, coupled to a first of said sequential ports, has a predetermined reflection spectrum for producing a reflected band from said optical signal within said reflection spectrum. The consecutive optical filters coupled to said respective consecutive ports of said optical circulator, also have each a reflection spectrum for producing a reflected band within said reflection spectrum, from a reflected band received from a preceding optical filter. Tuning means are provided for tuning at least one of said optical filters such as to cause said reflection spectrum of said first filter to partly overlap, in a predetermined manner, the bandwidth of said optical signal and to cause said reflection spectra of said consecutive optical filters to overlap in a predetermined manner.

BRIEF DESCRIPTION OF THE DRAWINGS

The invention will be explained in more detail by way of the following disclosure to be taken in conjunction with the drawings in which.

DETAILED DESCRIPTION OF THE INVENTION

The device, or system, of the invention may be installed on a waveguide system, e.g. on an optical fiber system, through which an optical signal to be processed is supplied.

Figure 1:
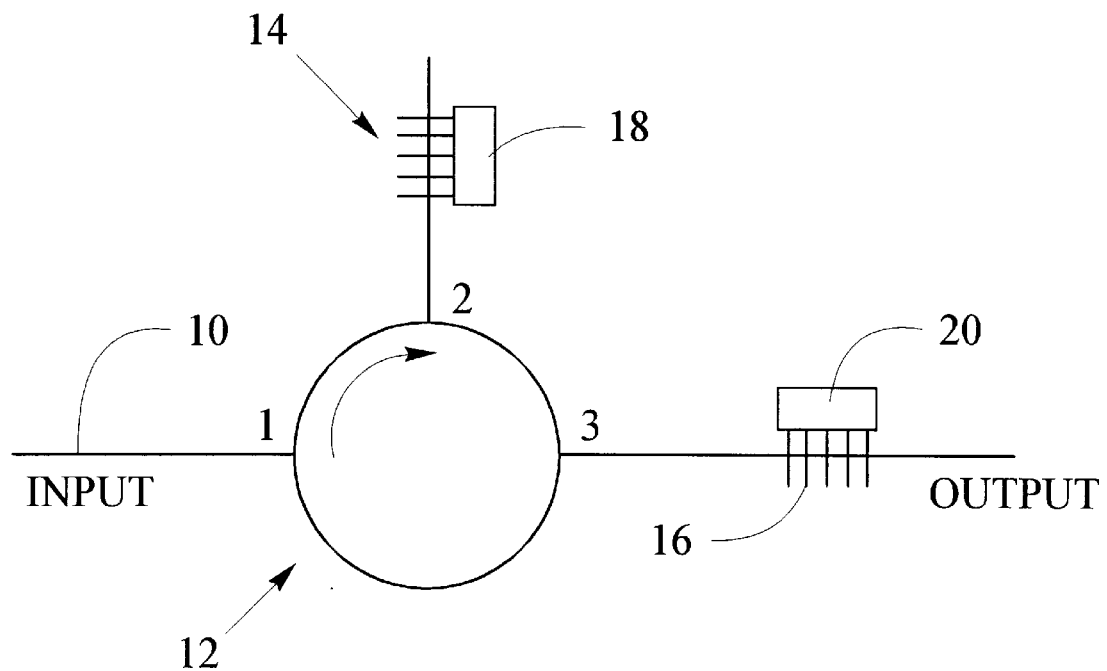
FIG. 1 illustrates a basic configuration of the device and system of the invention.

Referring now to FIG. 1, a basic system of the invention is installed on an optical fiber 10 which is connected to port 1 of a three-port optical circulator 12. A fiber Bragg grating 14 is coupled to port 2 of the circulator and another Bragg grating 16 is coupled to port 3.

Each grating is associated with a respective tuning element 18, 20 which may be embodied by a piezoelectric stack capable of stretching or compressing the respective grating and thus shifting the characteristic reflective band of the grating. The tuning function can be realized by a variety of means, such as changing the temperature.

As disclosed in U.S. Pat. No. 5,007,705, the specification of which is being incorporated herewith by reference, various means can be employed for modifying the reflection wavelength response of a Bragg grating. Tuning can be effected by deliberately varying the period of the grating (so-called chirping) using controlled external forces or actions on the fiber section containing the grating. It is also known to tune a grating by application of heat, compression, bending (uniform or non-uniform) or stretching. Uniform stretching (or uniform bending), shifts the wavelength response of the grating. Non-uniform stretching (or non-uniform bending), i.e. altering the periodicity of the grating (chirping), results in an expansion of the reflection wavelength response in an accordion manner. Non-uniform compressing of the grating achieves a reverse effect, i.e. a "folding: of the wavelength response.

An optical signal to be processed is input through waveguide 10 into the port 1. The signal may typically be a broadband signal to be trimmed to a specific central wavelength and bandwidth.

Figure 2A:
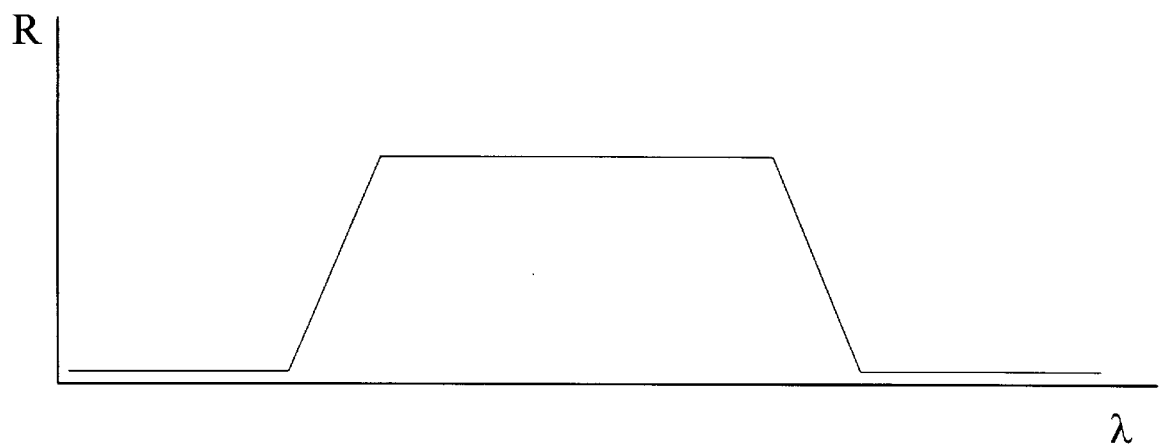
FIG. 2a is a graph illustrating the reflection spectrum of a first optical filter.

The reflective spectrum of the first filter 14 is shown in FIG. 2a which is a simplified graph of reflection optical power R vs. wavelength λ. A broadband optical signal passed from port 1 to port 2 of the circulator 12 will be partly reflected by the filter (grating) 14 according to the spectrum of FIG. 2a. The spectrum may be shifted by controlling the tuning element 18. The element may also be a chirping element such as to enable the optical spectrum to be expanded in a predetermined manner, as described above.

The remaining part of the optical signal entering the optical circulator 12 will be transmitted through the filter 14 (assuming any internal absorption losses as meaningless).

Figure 2B:
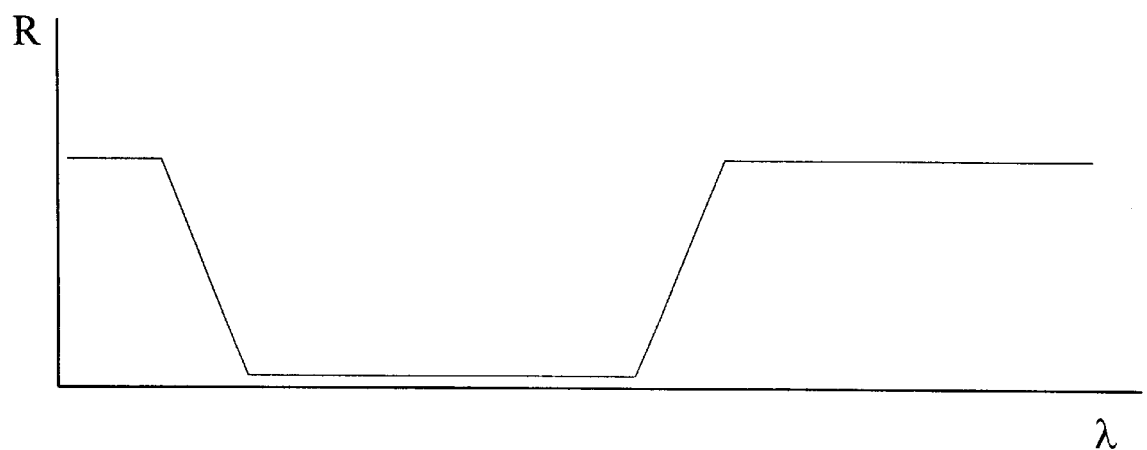
FIG. 2b is a graph illustrating the transmission spectrum of a second optical filter.

The reflected band from the filter 14 will pass from port 2 to port 3 of circulator 12 and then to filter 16. The transmission spectrum of filter 16 is shown in FIG. 2b, a graph of transmission optical power vs. wavelength, with a wavelength scale analogous to that of FIG. 2a. It is understood that the maximum transmission corresponds to minimum reflection on both graphs.

The transmission spectrum, and correspondingly the reflection spectrum of the filter 16 can also be tuned by the tuning element 20 in a manner as described above.

Figure 2C:
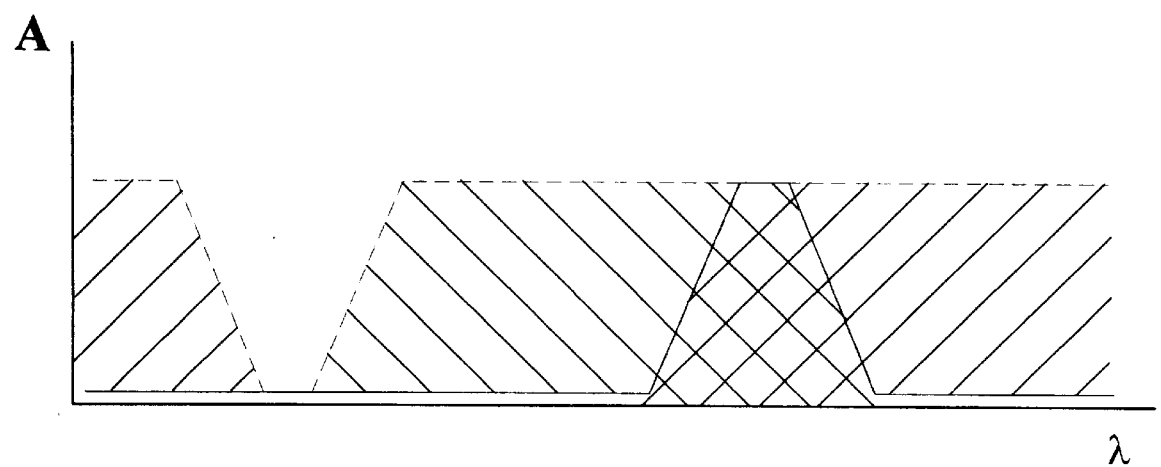
FIG. 2c is a graph illustrating the spectrum of the filtered signal produced by the system of FIG. 1.

A comparison of the two graphs (by overlaying), i.e. the respective reflective and transmissive spectra of the filters 14, 16, yields a spectrum, defined by the bandwidth and central wavelength of the resulting band which is transmitted through filter 16 as an output of the system. That exemplary spectrum is illustrated in FIG. 2c. The spectrum, being a result of the overlap of the reflective and transmissive spectra of FIG. 2a and 2b, is represented graphically in FIG. 2c by hatching. The band reflected by the filter 16, as well as the signal transmitted through the filter 14, are of no significance in the embodiment of FIG. 1, but may be utilized in other configurations of the invention, described hereinbelow.

It will be understood that the spectrum and shape of the output signal of FIG. 2c may be tuned within the limits of the tuning elements 18, 20. For example, the transmission spectrum of FIG. 2b may be movable towards lower wavelengths (to the left in FIG. 2a) which will result in a broadened spectrum of FIG. 2c, and vice versa.

Figure 3:
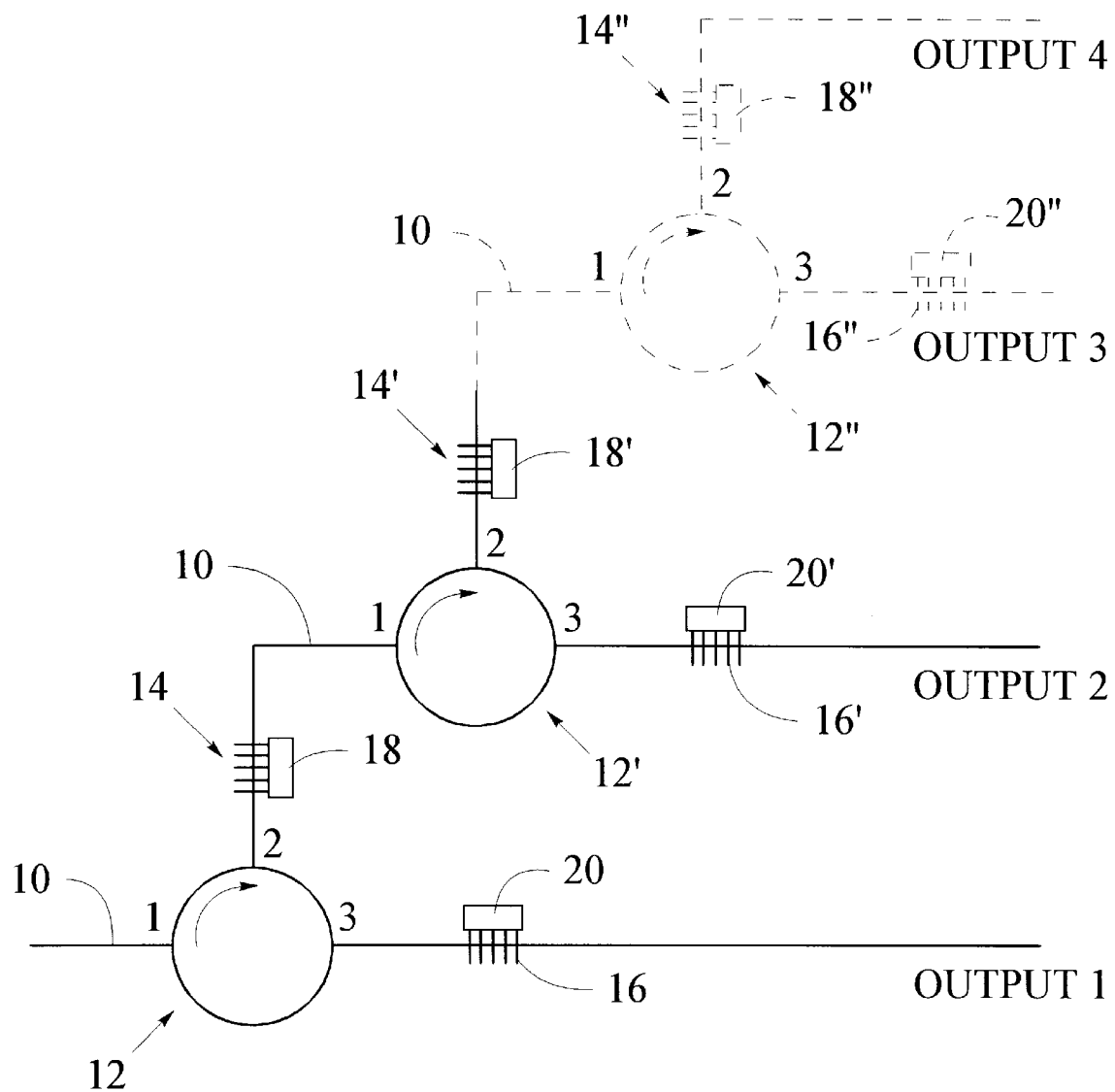
FIG. 3 shows a cascade multi-channel configuration of the system of the invention wherein a plurality of optical circulators is used.

Turning now to FIG. 3, in which like reference numerals denote like elements as in FIG. 1, three-port optical circulators 12, 12', 12" are coupled into a network via optical waveguides 10 in which are installed Bragg gratings 14, 16, 14', 16', 14" and 16". The gratings are each associated with a tuning element 18, 20, 18', 20', 18" and 20" respectively.

The circulator 12, optical filters 14, 16 and respective tuning elements 18, 20 constitute a basic block of the configuration of FIG. 3. It will be easily understood that the signal passed to circulator 12 through port 1 to port 2 and filter 14, will be partly reflected subject to the normal reflective characteristic and/or tuning of the filter 14 in a predetermined manner, dependent on the desired bandwidth and wavelength of the reflected band. The reflected band is directed to port 3 of circulator 12 and filtered by the filter 16 which is again subject to tuning in a predetermined manner. The bandwidth transmitted through filter 16 which may be tuned as necessary, is the output signal designated as output 1. The signal transmitted through filter 14 is processed through an analogous block 12', 14', 16', 18' and 20, the signal produced by this block being designated as output 2. In an analogous manner, this configuration may be extended into a number of blocks as illustrated with phantom lines, with the respective output 3, output 4 . . . etc. signals. Thus, the configuration illustrated in FIG. 3 is an "drop" system, wherein only one initial signal is illustrated in FIG. 3.

Figure 4:
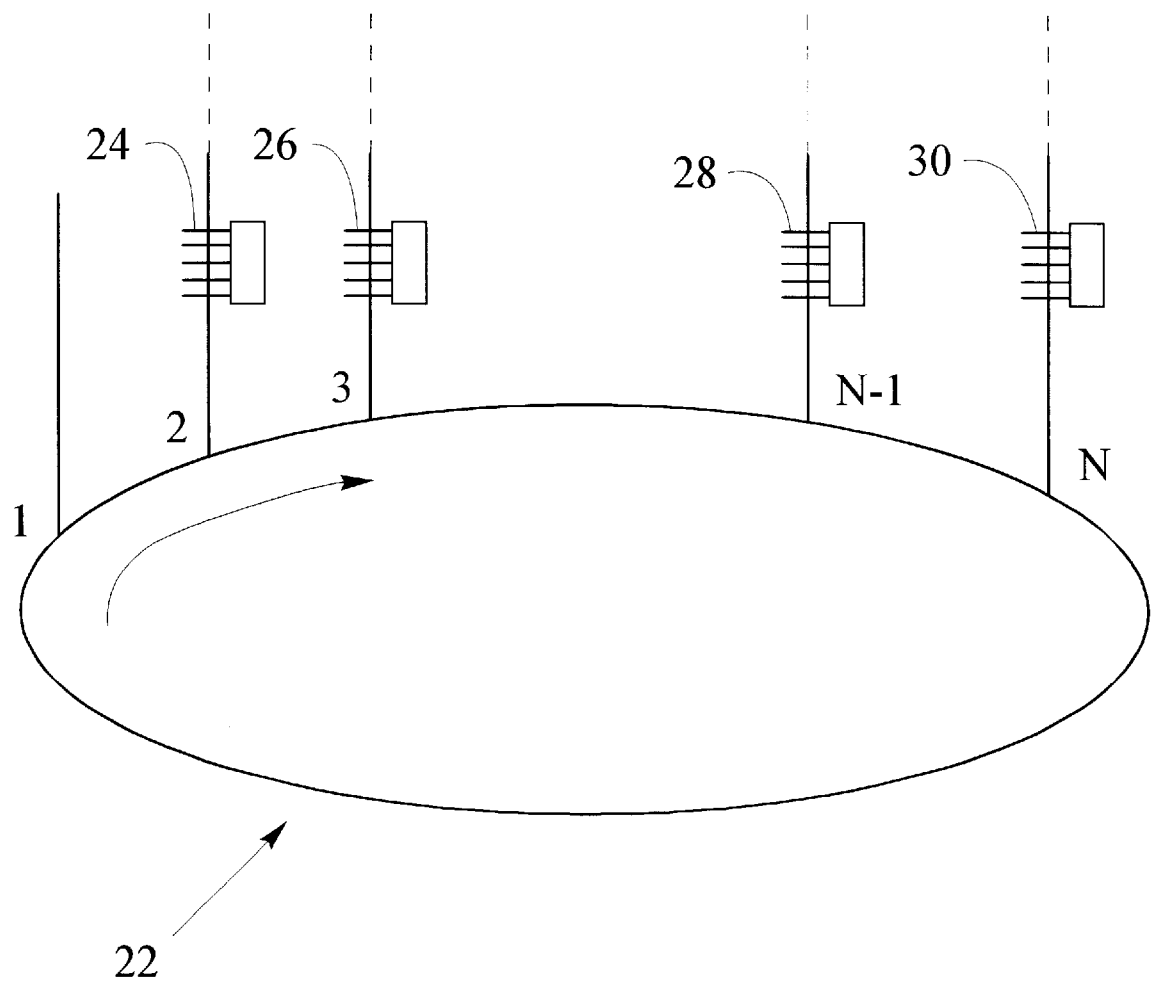
FIG. 4 shows a multi-channel embodiment based on a multi-port optical circulator.

Another configuration is illustrated in FIG. 4. A multi-port circulator 22 has an input port 1 and a plurality of sequential ports 2, 3 . . . N. Optical filters 24, 26, 28, 30 are installed at least at each of the ports 2, 3 . . . N-1, each of the filters being associated with a tuning element. The port N may be provided with an optical filter having a predetermined transmission spectrum, or may be left without a filter. The filters associated with ports 2, 3, . . . N-1 each have preferably a predetermined reflection spectrum thus being capable, subject to the proper range and tuning of the spectra of the filters, of consecutively trimming the signal received as a reflected band from the preceding filter, or, in case of the first filter in sequence, the initial signal.

The configuration of FIG. 4 lends itself to a further cascade-type buildup wherein blocks such as the one illustrated in FIG. 1, or a block based on another multi-port circulator, are added to process signals, indicated schematically with phantom lines in FIG. 4, the signals transmitted through, rather than reflected from, the respective filters 24, 26, 28, 30.

It will be appreciated that the configuration of FIG. 4 and its elements are interchangeable with elements of the configuration of FIG. 3, or with the configuration of FIG. 1.

Numerous applications may be envisaged for the systems of the invention. They may be used as tunable filter wherein the bandwidth and central wavelength can be tuned independently. The bandwidth can obviously be narrower than that of the reflection filter or the transmission filter in each basic block (see FIGS. 2a–2c). The system can also be used, with a simple modification, as an add/drop unit in WDM communication systems and networks.

While Brag gratings or grating elements are described and illustrated herein, other optical filters may also be employed provided that those filters lend themselves to effective tuning (shifting or expanding their respective reflection or transmission spectrum).

Commonly, bandpass interference filters have a transmission optical power spectrum similar to the reflection optical power spectrum of a Bragg fiber grating. Therefore, when using such an interference filter, the arrangement of filters will differ. Two separate configurations will now be discussed in conjunction with FIGS. 5 and 6.

Figure 5:
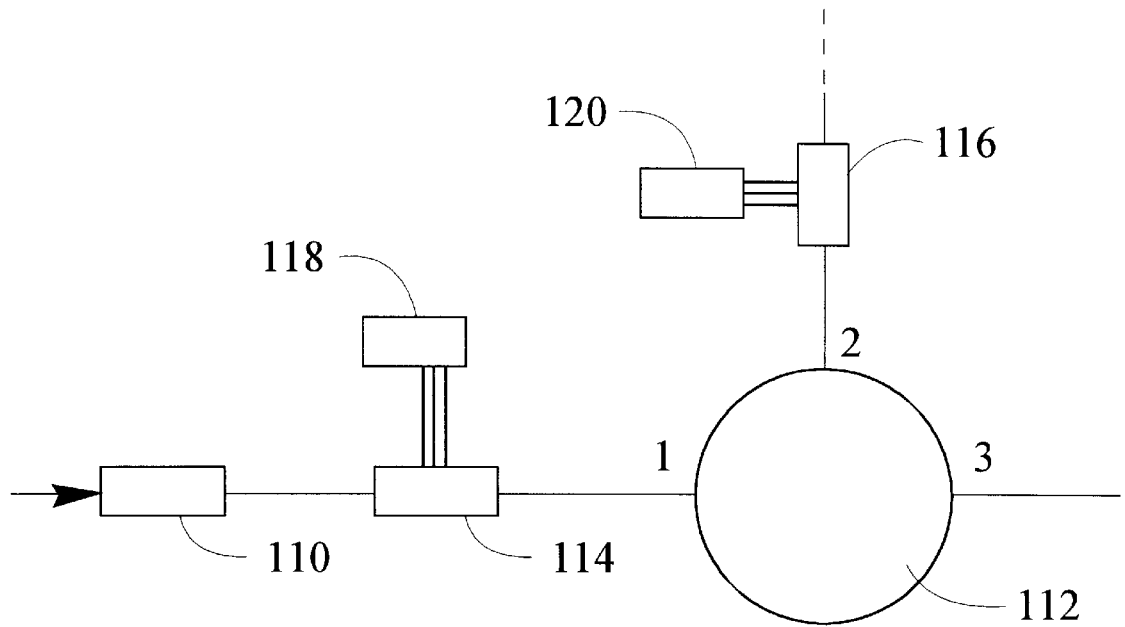
FIG. 5 illustrates a basic configuration of the device and system of the invention using an interference filter.

Referring to FIG. 5, an optical signal to be processed is input through waveguide 110, through filter 114 and into the port 1 of a circulator 112. The signal may typically be a broadband signal to be trimmed to a specific central wavelength and bandwidth.

A broadband optical signal passing through filter 114 will be partly transmitted by the filter 114 according to a spectrum similar to that of FIG. 2a. The spectrum may be shifted by controlling the tuning element 118.

The transmitted band from the filter 114 will pass from port 1 to port 2 of circulator 112 and then to filter 116. The reflection spectrum of filter 116 is similar to that shown in FIG. 2b.

The transmission spectrum, and correspondingly the reflection spectrum of the filter 16 can also be tuned by the tuning element 120 in a manner as described above. The transmitted portion of the signal is tuned for central wavelength and band width. At port 3 of the circulator 112, is a signal containing substantially all of the optical signal reflected by filter 116.

Figure 6:
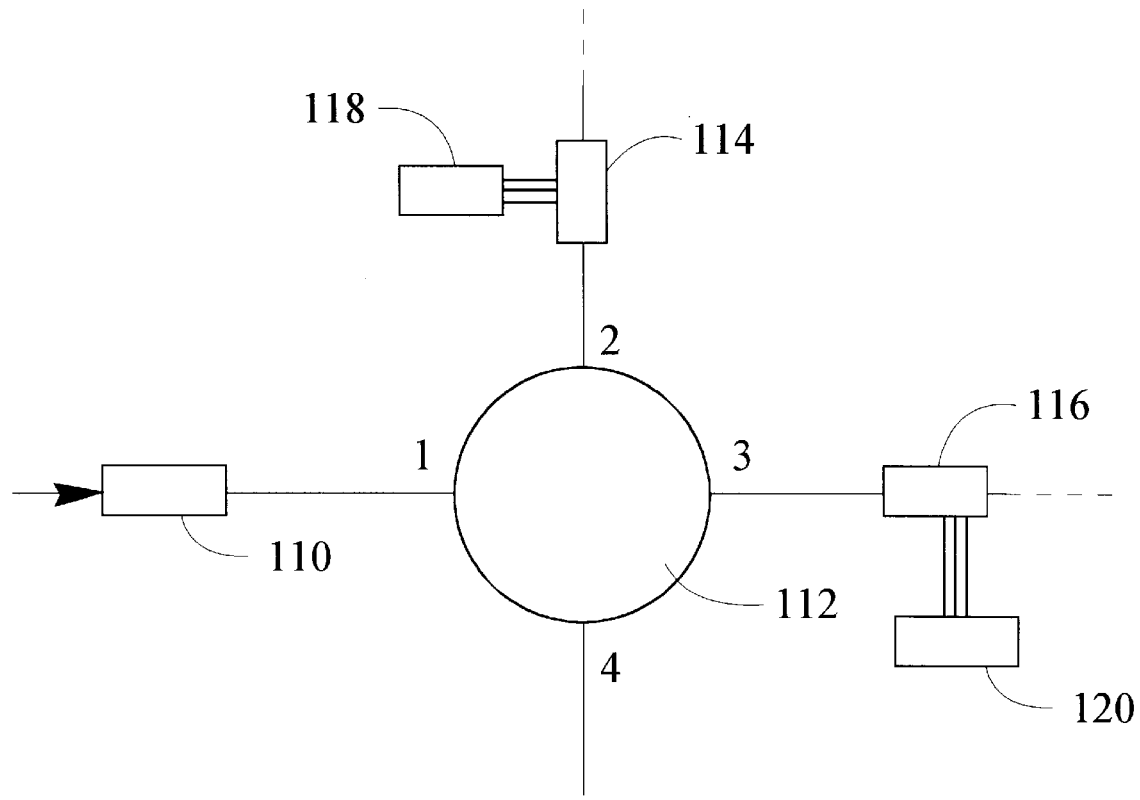
FIG. 6 illustrates a further configuration of the device and system of the invention using an interference filter.

Alternatively, as shown in FIG. 6, an optical signal to be processed is input through waveguide 110 into the port 1 of a circulator 112. The signal may typically be a broadband signal to be trimmed to a specific central wavelength and bandwidth.

The transmission spectrum of the first filter 114 is a passband. A broadband optical signal passed from port 1 to port 2 of the circulator 12 will be partly reflected by the filter 114 according to a spectrum similar to the spectrum of FIG. 2b. The spectrum may be shifted by controlling the tuning element 118.

The remaining part of the optical signal entering the optical circulator 112 will be transmitted through the filter 114 (assuming any internal absorption losses as meaningless).

The reflected signal from the filter 114 will pass from port 2 to port 3 of circulator 112 and then to filter 116. The transmission spectrum of filter 116 is a passband similar to that shown in FIG. 2a. It is understood that the maximum transmission corresponds to minimum reflection on both graphs.

The transmission spectrum, and correspondingly the reflection spectrum of the filter 116 can also be tuned by the tuning element 120 in a manner as described above.

It is noted that the optical signal present at port 4 of circulator 112 and at an output to filter 114 differ from analogous outputs in an embodiment using Bragg gratings.

Various other configurations and embodiments will occur to those versed in the art, and it is understood that such variants are all within the ambit of the present invention which is defined by the appended claims.

What I claim is:

1. A tunable optical filter device for modifying an optical signal comprising:
   a first optical filter for reflecting at least a band of first predetermined wavelengths of incident light and for transmitting other wavelengths;
   a second optical filter optically coupled to the first optical filter and for transmitting at least a band of second predetermined wavelengths of incident light and for reflecting other wavelengths; and
   tuning means for tuning at least one of the first optical filter and the second optical filter such that at least part of the band of first predetermined wavelengths overlaps with at least part of the band of second predetermined wavelengths.

2. A tunable optical filter device as defined in claim 1, comprising:
   an optical circulator having at least three ports, including an input port for receiving said optical signal, a second port coupled to the first optical filter, and an output port coupled to the second optical filter.

3. A tunable optical filter device as defined in claim 2 wherein said tuning means are means for shifting at least one of the at least a band of first predetermined wavelengths of incident light and the at least a band of second predetermined wavelengths of incident light.

4. A tunable optical filter device as defined in claim 2 wherein said tuning means are means for expanding one of the at least a band of first predetermined wavelengths of incident light and the at least a band of second predetermined wavelengths of incident light.

5. A tunable optical filter device as defined in claim 2 wherein at least one of said first optical filter and said second optical filter is a tunable Bragg grating.

6. A tunable optical filter device as defined in claim 1, comprising:
   an optical circulator having at least three ports, including an input port for receiving said optical signal and coupled to the second optical filter, a second port coupled to the first optical filter, and an output port.

7. A tunable optical filter device as defined in claim 6 wherein said tuning means are means for shifting at least one of the at least a band of first predetermined wavelengths of incident light and the at least a band of second predetermined wavelengths of incident light.

8. A tunable optical filter device as defined in claim 6 wherein said tuning means are means for expanding one of the at least a band of first predetermined wavelengths of incident light and the at least a band of second predetermined wavelengths of incident light.

9. A tunable optical filter device as defined in claim 6 wherein at least one of said first optical filter and said second optical filter is an interference filter.

10. A tunable optical filter device as defined in claim 1 wherein said tuning means are means for shifting at least one of the at least a band of first predetermined wavelengths of incident light and the at least a band of second predetermined wavelengths of incident light.

11. A tunable optical filter device as defined in claim 1 wherein said tuning means are means for expanding one of the at least a band of first predetermined wavelengths of incident light and the at least a band of second predetermined wavelengths of incident light.

12. A tunable optical filter device as defined in claim 1 wherein at least one of said first optical filter and said second optical filter is an interference filter.

13. A tunable optical filter device as defined in claim 1 wherein at least one of said first optical filter and said second optical filter is a tunable Bragg grating.

14. A tunable optical filter device for modifying an optical signal comprising:

- a first optical filter having a predetermined reflection spectrum, for receiving said optical signal and for producing a reflected band within said reflection spectrum,
- a second optical filter having a predetermined transmission spectrum, said second optical filter being optically coupled to said reflected band of said first optical filter, for producing a transmitted band within said transmission spectrum, and
- tuning means for tuning at least one of said first optical filter and said second optical filter to cause said reflection spectrum of said first filter to partly overlap in a predetermined manner with the wavelength and bandwidth of said optical signal thus causing said first filter to produce a reflected band, and to cause said transmission spectrum of said second optical filter to overlap with said reflected band in a predetermined manner.

15. A tunable optical filter device of claim 14 wherein a signal transmitted by the first optical filter forms a second optical signal, the device further comprising

- a third optical filter coupled to said second optical signal, said third optical filter having a reflection spectrum, for producing a second reflected band of said second optical signal within said reflection spectrum,
- a fourth optical filter coupled to said second reflected band from said third filter, said fourth optical filter having a transmission spectrum, for producing a second transmitted band of said reflected band within transmission spectrum of said fourth filter, and
- tuning means for tuning at least one of said third optical filter and said fourth optical filter such as to cause said reflection spectrum of said third optical filter to partly overlap with the bandwidth of said second optical signal and to cause said reflection spectrum of said third filter and said transmission spectrum of said fourth filter to overlap in a predetermined manner.

16. A tunable optical filter device as defined in claim 15 wherein a signal transmitted by the said third optical filter forms a third optical signal, and wherein said third optical filter, said fourth optical filter and the respective tuning means constitute a module, said device comprising a plurality of said modules, each of the modules being coupled to a preceding module in an analogous manner.

17. A tunable optical filter device as defined in claim 16 wherein at least one of said first optical filter and said second optical filter is a tunable Bragg grating.

18. A tunable optical filter device as defined in claim 16 wherein at least one of said first optical filter and said second optical filter is an interference filter.

19. A tunable optical filter device for modifying an optical signal comprising:

- an optical circulator having an input port for receiving an optical signal, a plurality N of second ports and an output port;
- a first optical filter having a reflection spectrum and coupled to a first of said second ports, for producing a reflected band from said optical signal within said reflection spectrum;
- a plurality N-1 of consecutive optical filters coupled to said respective second ports of said optical circulator, said consecutive optical filters each having a reflection spectrum, for producing a reflected band within reflection spectrum, from a reflected band received from a preceding optical filter; and
- tuning means for tuning at least one of said first optical filter and said consecutive optical filter such as to cause said reflection spectrum of said first filter to partly overlap in a predetermined manner the bandwidth of said optical signal and to cause said reflection spectra of said consecutive optical filters to overlap in a predetermined manner.

20. A tunable optical filter device as defined in claim 19, further comprising

- a transmissive optical filter having a predetermined transmission spectrum and coupled to the Nth port of said optical circulator, for producing a transmitted band within said transmission spectrum from a reflected band received from a preceding optical filter, and
- tuning means for tuning said transmissive optical filter to cause its transmission spectrum to overlap in a predetermined manner with the bandwidth of a reflected band received from a preceding optical filter.

21. A tunable optical filter device as defined in claim 19 wherein at least one of said optical filters is a tunable Bragg grating.

22. A tunable optical filter device as defined in claim 19 wherein at least one of said first optical filter and said second optical filter is an interference filter.

* * * * *